United States Patent [19]

van der Lely

[11] 4,180,134

[45] Dec. 25, 1979

[54] SOIL CULTIVATING IMPLEMENTS

[76] Inventor: Cornelis van der Lely, 7, Brüschenrain, Zug, Switzerland

[21] Appl. No.: 860,281

[22] Filed: Dec. 14, 1977

[30] Foreign Application Priority Data

Dec. 20, 1976 [NL] Netherlands ............... 7614117

[51] Int. Cl.² .............................................. A01B 19/06
[52] U.S. Cl. ....................................................... 172/59
[58] Field of Search ................... 172/59, 97, 102, 111, 172/53, 51, 52, 54

[56] References Cited

U.S. PATENT DOCUMENTS

| | | | |
|---|---|---|---|
| 3,774,687 | 11/1973 | Lely | 172/59 |
| 3,887,014 | 6/1975 | Lely | 172/59 |
| 3,985,184 | 10/1976 | Lely | 172/53 |
| 4,003,438 | 1/1978 | Lely | 172/59 |

*Primary Examiner*—Richard J. Johnson
*Attorney, Agent, or Firm*—Mason, Mason and Albright

[57] ABSTRACT

A soil cultivating implement has an elongated hollow frame portion that houses an eccentric drive transmission to a row of soil working members mounted on respective upwardly extending shafts journalled on the frame portion. The eccentric drive includes two eccentric discs that are mounted out-of-phase on an upwardly extending driving shaft. The eccentrics are pivoted to radial arms on the member shafts of different alternate soil working members by connecting rods so that adjacent members are oscillated in relatively opposite directions. The shafts are located in a plane that is substantially parallel to the longitudinal center line of the frame portion and to the rear of that line and the rods. Each member has three radial arm supports with respective tines, two of the arms being shorter than a third. It is preferred that the longer arm support of alternate members extend rearwardly in the center of its oscillating path and opposite to the direction of the arm supports of adjacent members. The tines are positioned to work overlapping strips of ground.

18 Claims, 7 Drawing Figures

SOIL CULTIVATING IMPLEMENTS

This invention relates to soil cultivating implements or machines of the kind which comprise a frame supporting a row of soil working members that are oscillatable. The expression "implement(s) or machine(s)" will be shortened to "implement(s)" alone throughout the remainder of this specification for the sake of brevity.

According to one aspect of the invention, there is provided a soil cultivating implement of the kind set forth, wherein a drive transmission to said members is arranged wholly or principally inside a hollow portion of said frame.

For a better understanding of the invention, and to show how the same may be carried into effect, reference will now be made, by way of example, to the accompanying drawings, in which.

Figure 1:
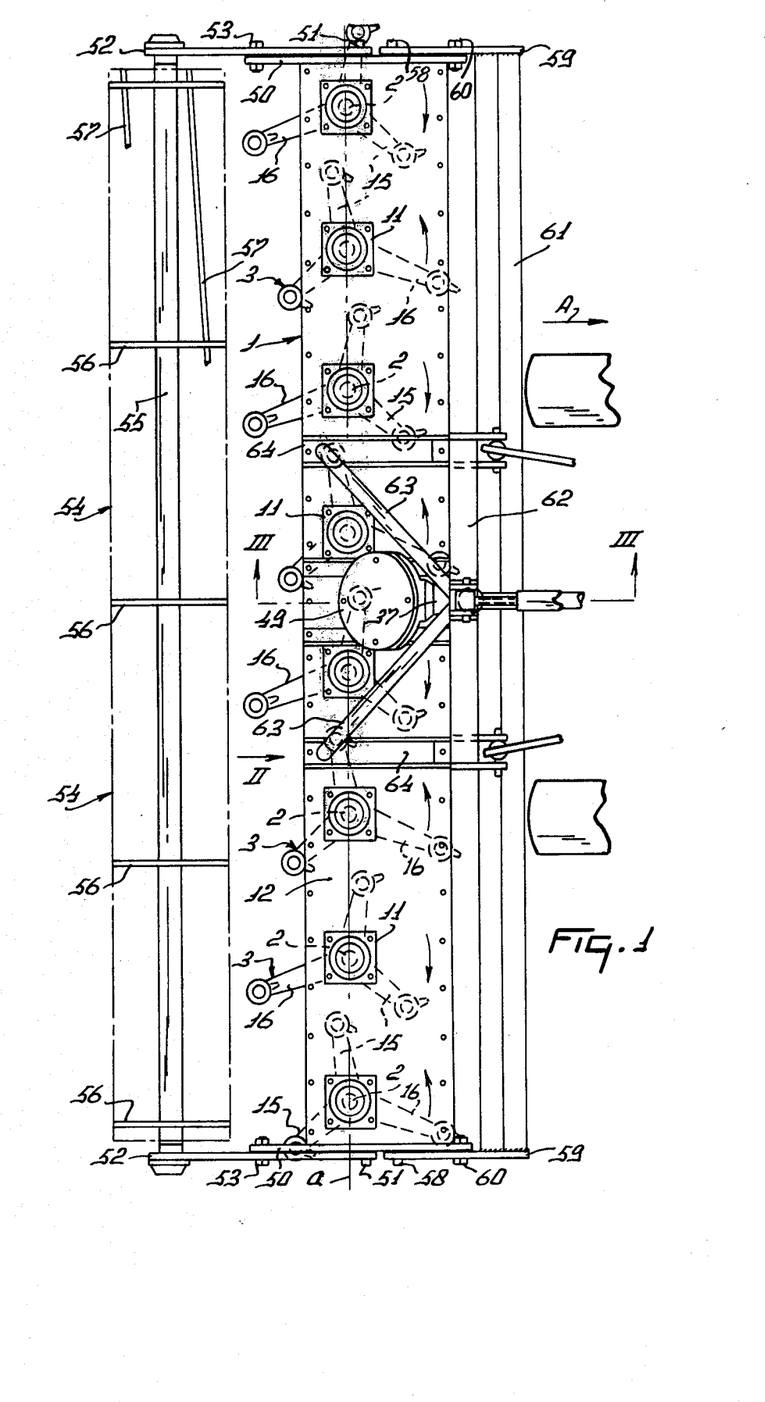
FIG. 1 is a plan view of a soil cultivating implement in accordance with the invention connected to the rear of an agricultural tractor.
Figure 4:
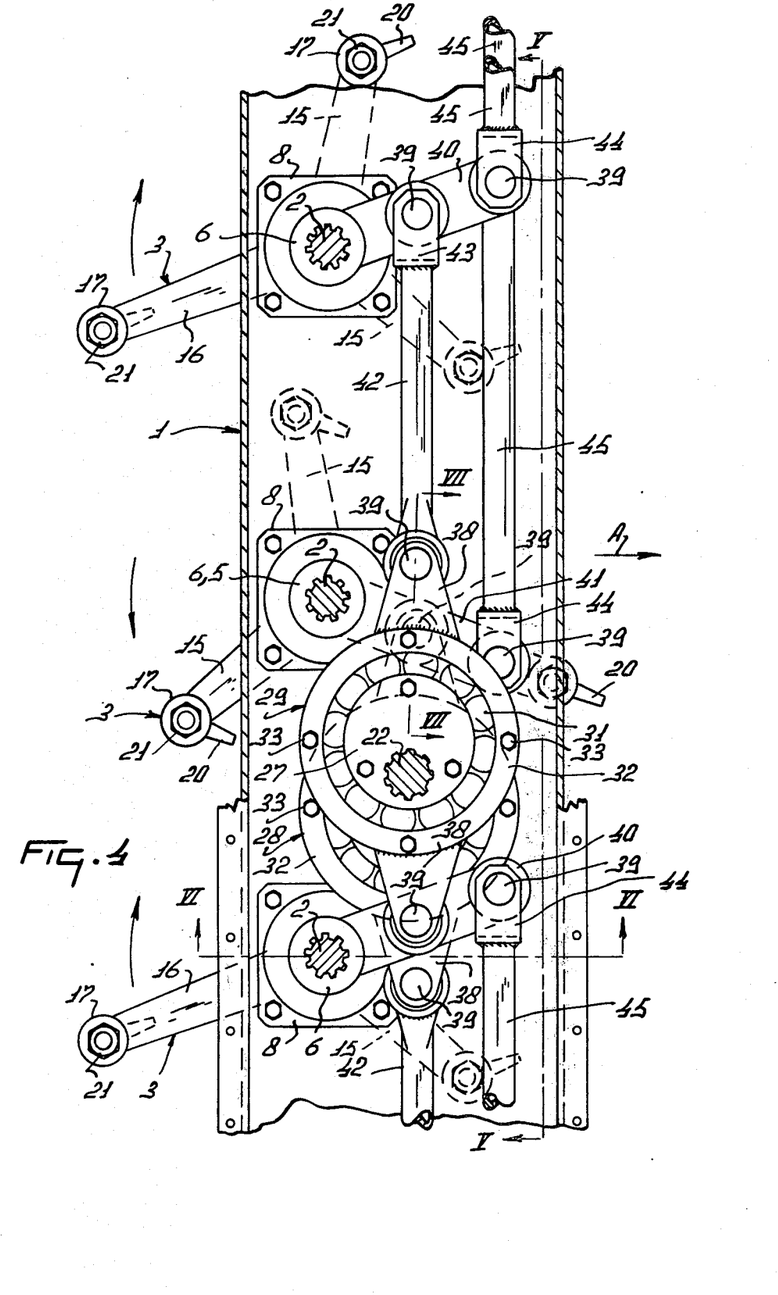
FIG. 4 is a sectional plan view of central parts of the implement of FIGS. 1 to 3 showing further details of the construction and arrangement of those parts.

Referring to the accompanying drawings, the soil cultivating implement that is illustrated therein has a hollow box-section frame portion 1 that extends substantially horizontally transverse, and usually (as illustrated) substantially perpendicular, to the intended direction of operative travel of the implement that is indicated by an arrow A in FIGS. 1 and 4 of the drawings. A plurality (of which there are eight in the example that is being described) of substantially vertical, or at least upwardly extending, shafts 2 are turnably journalled in the frame portion 1 in a manner that will be described in greater detail below, said shafts 2 being arranged in a single row with their longitudinal axes spaced apart from one another at regular intervals which, in the example that is being described, have magnitudes of 375 millimeters. A lower end of each shaft 2 projects downwardly from beneath the bottom of the hollow frame portion 1, the downwardly projecting portion being provided with a corresponding soil working member 3 that will hereinafter be described. It can be seen in FIG. 1 of the drawings that an upwardly extending plane a, that will usually be vertically or substantially vertically disposed, contains the longitudinal axes of all of the shafts 2, said plane a being located to the rear, with respect to the direction A, of a parallel plane (not shown) which contains the longitudinal axis of the hollow frame portion 1. The plane a is spaced from the rear of the hollow frame portion 1 by a distance which is substantially one-third of the total fore and aft width of that frame portion 1. In the example which is being described, four of the eight shafts 2 are located at one side of the midpoint of the hollow frame portion 1 whilst the other four shafts 2 are located at the opposite side of the midpoint.

Figure 6:
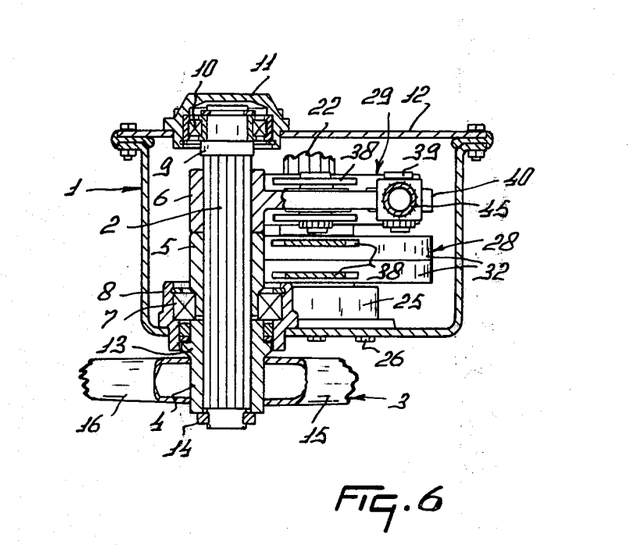
FIG. 6 is a section taken on the line VI—VI in FIG. 4.

Each shaft 2 is splined throughout most of its length, said splines co-operating with matching internal splines in lower, central and upper sleeves 4, 5 and 6 (see FIG. 6), said sleeves being introduced onto the corresponding shaft 2 from the lower end thereof. Each central sleeve 5 is of reduced external diameter at its lower end, the reduced diameter portion being surrounded by the inner race of a corresponding ball bearing 7, the outer race of that bearing 7 being accommodated in a housing 8 and the lower end of said housing 8 being arranged to project downwardly through a corresponding hole that is formed in the flat bottom of the hollow frame portion 1. A circlip retains the outer race of each bearing 7 in its housing 8, said circlip having its outer edge engaged in a groove that is formed in the internal surface of the housing 8 close to the uppermost end thereof (see FIG. 6). Each shaft 2 is formed, close to its upper end, with an enlarged diameter shoulder 9 and has a short unsplined portion above that shoulder 9 which portion is indirectly surrounded by a ball bearing 10 that is indirectly lodged in a corresponding upper bearing housing 11 which fits in a corresponding hole in a flat top cover plate 12 of the frame portion 1, each housing 11 being secured to the cover plate 12 by groups of four bolts whose positions can be seen in FIG. 1 of the drawings. Each upper ball bearing 10 is enclosed between corresponding mounting rings and it will be seen from FIG. 6 of the drawings that these mounting rings are retained in their appointed positions by circlips that are engaged in grooves in the internal surfaces of the housings 11 and circlips that are engaged in grooves which are formed in the shafts 2, themselves, very close to the uppermost ends of those shafts.

Each lower sleeve 4 has an enlarged diameter flange 13 towards its upper end which flange is located just inside the mouth at the lower end of the corresponding lower bearing housing 8, the clearance between each flange 13 and the corresponding housing 8 being minamal to prevent the ingress of external contamination. In addition, rotary seals that are diagrammatically illustrated in FIG. 6 of the drawings lie above each flange 13 in the space between the external surface of the upper end of each lower sleeve 4 and the surrounding internal surface of the respective lower bearing housing 8. Each shaft 2 has a very short screwthreaded portion of reduced diameter at its lowermost end and that portion receives a corresponding nut 14 which nut prevents the corresponding lower sleeve 4 from being axially disengaged from its shaft 2. The nuts 14 are preferably of a kind which includes an insert designed to prevent loosening occuring as the result of vibration during operation. That portion of each lower sleeve 4 which projects downwardly from beneath the corresponding flange 13 is provided with three radially extending hollow arms 15 and 16, the two arms 15 being of the same length and the arm 16 being of a different and longer length. The three arms 15 and 16 of each soil working member 3 project radially with respect to the longitudinal axis of the corresponding shaft 2 at substantially 120° intervals around that axis, their radially inner ends being welded or otherwise rigidly secured to the lower sleeve 4 concerned. Each longer arm 16 has substantially 1½ times the length of each shorter arm 15. The radially outer end of each of the arms 15 and 16 is provided with a corresponding sleeve-like holder 17 whose axis extends parallel or substantially parallel to the longitudinal axis of the corresponding shaft 2. Each holder 17 receives a fastening portion 18 of a corresponding rigid soil working tine 19, each such tine 19 also comprising a soil working portion 20 that projects downwardly into the ground, when the implement is in use, from the lower end of its fastening portion 18. Both portions 18 and 20 of each tine 19 have a polygonal cross-section which it is preferred should be the square cross-section that is illustrated in the drawings. The upper end of each fastening portion 18 is, however, of basically circular cross-section and is formed with a screwthread that co-operates with a fastening nut 21 in maintaining the tine 19 concerned in its appointed operative position. The soil working portion 20 of each tine 19 is substantially straight throughout a major portion of its length which portion is in parallel or substantially parallel relationship with the longitudinal axis of the corresponding shaft 2 but, towards its lowermost end, each tine portion 20 is curved downwardly, and generally forwardly with respect to the direction A, the curved region being of tapering configuration towards its lowermost free end or tip. It will become apparent below that each soil working member 3 oscillates, rather than rotates, about the longitudinal axis of the shaft 2 to which it is secured but it is noted that, due to the lengths of the shorter and longer arms 15 and 16, the strips of land that are worked by the tines 19 of the individual members 3 overlap one another to produce, in effect, a single broad strip of worked soil which, in the case of the example that is being described, will have a width of substantially 3 meters.

Figure 5:
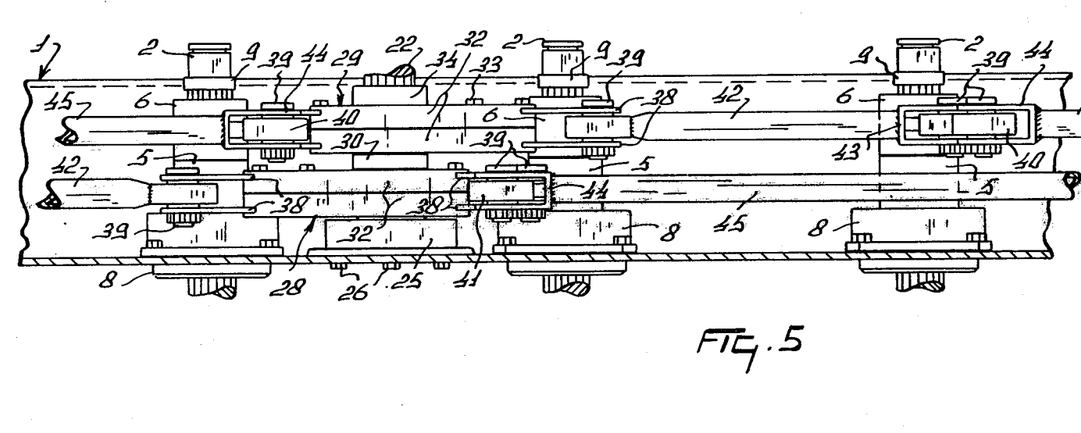
FIG. 5 is a section taken on the line V—V in FIG. 4.

A drive transmission that is provided for the eight soil working members 3 comprises a shaft 22 (FIGS. 3, 4 and 5), said shaft 22 being an upwardly extending rotary shaft that is in parallel relationship with the eight shafts 2 and that is positioned substantially midway between the opposite lateral ends of the hollow frame portion 1 and substantially midway, in the direction A, between the front and rear walls of that frame portion 1. The lower end of the shaft 22 is shouldered and is provided with a ball bearing 23 whose outer race is arranged in a housing 25 that has an internal rim at its upper end. The lower end of the housing 25 is secured to the bottom of the hollow frame portion 1 by substantially vertically disposed bolts 26 and it will be seen from FIG. 3 of the drawings that said bottom is formed with an inwardly directed rim 26A that surrounds the exterior of the housing 25 for locating purposes. The rim 26A is a deformation of the otherwise flat bottom of the hollow frame portion 1. The shaft 22 has a short lowermost screwthreaded end portion of reduced diameter and said end portion receives a nut 24 which co-operates with an inner mounting ring for the inner race of the ball bearing 23. The nut 24, like the nuts 14, is preferably of a kind which includes an insert designed to prevent the nut from working loose when the implement is in operation. The shaft 22 is provided, above the bearing 23, with lower and upper eccentric mechanisms 28 and 29, respectively, each of those mechanisms 28 and 29 comprising a corresponding pair of eccentric discs 27, the two discs 27 of each pair being fastened to one another by corresponding bolts and the upper pair of discs 27 being spaced axially along the shaft 22 from the lower pair of discs 27 by a sleeve 30 arranged around the shaft 22. The openings by which the four discs 27 engage the shaft 22 are, of course, internally splined (see FIG. 4) so that each pair of discs 27 is fast in rotation with the shaft 22. However, the two pairs of discs 27 are 180° out of register with one another around the longitudinal axis of the shaft 22 as regards their eccentricities.

The upper and lower discs 27 of each pair are peripherally shouldered and the inner races of corresponding ball bearings 31 are clamped, by the bolts 27A, between said shoulders. The outer race of each ball bearing 31 is surrounded by symmetrically opposed shouldered upper and lower rings 32 which rings are clamped together, around said outer race, by bolts 33 that extend parallel to the longitudinal axis of the shaft 22. A further spacer sleeve 34 surrounds the shaft 22, immediately above the upper pair of eccentric discs 27, the upper end of said sleeve 34 supporting the lower surface of the inner race of a ball bearing 35. The outer race of the ball bearing 35 is arranged in a surrounding housing 36, the housing being located in a central opening in the top cover plate 12 of the frame portion 1 and being in the form of a lower part of a gear box 37 into which gear box projects the upper end of the rotary shaft 22.

Each pair of rings 32 which, for practical purposes, may be considered as being a single ring, is provided at two diametrically opposed locations on its periphery with corresponding horizontally projecting pairs of upper and lower lugs 38. One pair of the lugs 38 of the lower eccentric mechanism 29 is turnably connected by a substantially vertically disposed pivot 39 (FIGS. 4 and 7) to an arm 41, said pivot 39 co-operating with an opening in the arm 41 by way of a ball bearing 39A, the arrangement of that ball bearing 39A being clearly illustrated in FIG. 7 of the drawings. The arm 41 has one end secured to the central sleeve 5 on that shaft 2 which is the first to the left from the center of the hollow frame portion 1 when that frame portion is viewed from the rear in the direction A, said arm 41 extending radially from that sleeve 5 and having the lugs 38 connected to it at a distance from the shaft 2 concerned. One pair of lugs 38 of the upper eccentric mechanism 29 is similarly connected by a further pivot 39 and a ball bearing 39A (not illustrated) to an arm 40 which arm 40 is secured to the upper sleeve 6 on that shaft 2 which is the first to the right from the midpoint of the hollow frame portion 1 when that frame portion is viewed from the rear in the direction A, said arm 40 extending radially with respect to the longitudinal axis of said shaft 2 and having the lugs 38 connected to it at a distance from the sleeve 6 concerned. In fact, the locations at which the pairs of lugs 38 that have just been discussed are connected to the corresponding arms 41 and 40 are midway along the lengths of those two arms. When the drive transmission is in the position that is shown in FIG. 4 of the drawings, the two arms 41 and 40 in question converge forwardly with respect to the direction A as seen in plan view.

Figure 2:
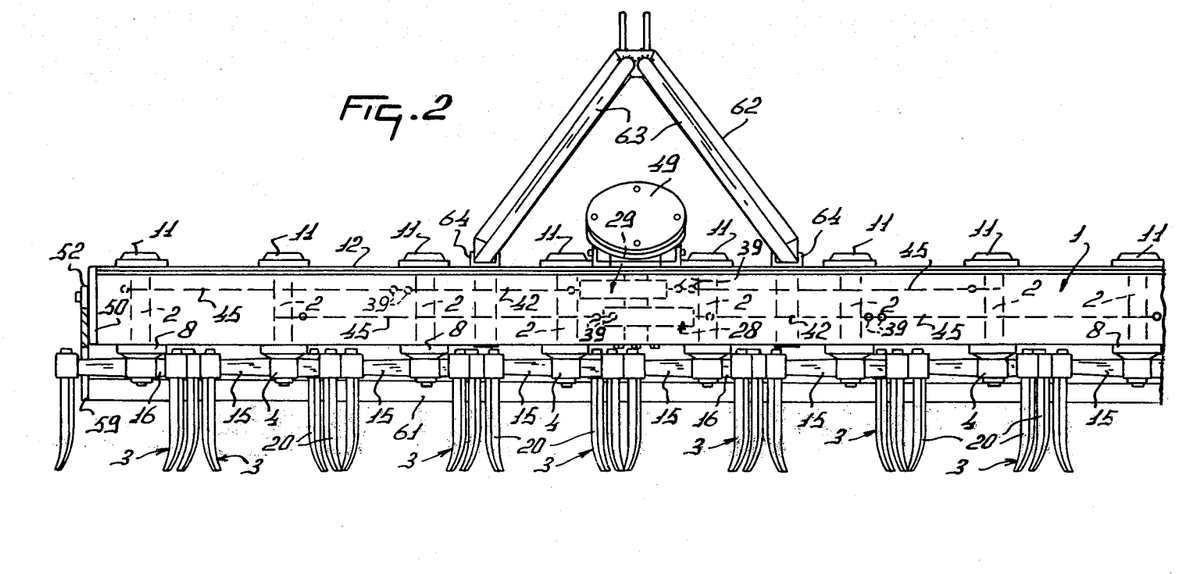
FIG. 2 is a rear elevation of parts of the implement of FIG. 1 as seen in the direction indicated by an arrow II in FIG. 1.
Figure 7:
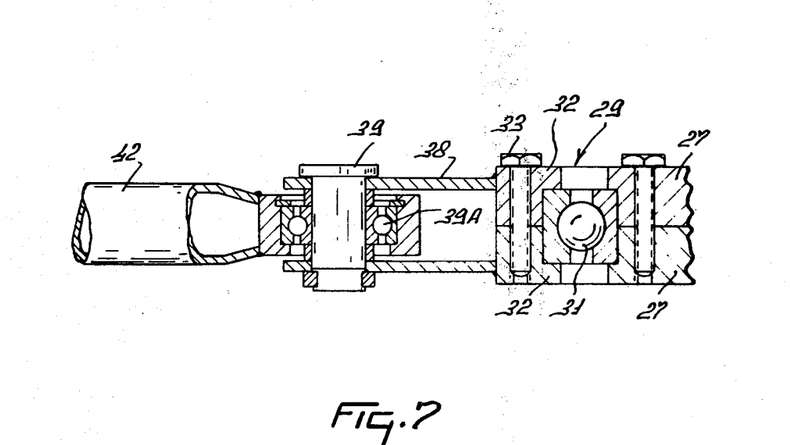
FIG. 7 is a section, to an enlarged scale, taken on the line VII—VII in FIG. 4.

The remaining pair of lugs 38 on the lower eccentric mechanism 28 and the remaining pair of lugs 38 on the upper eccentric mechanism 29 are turnably connected by further pivots 39 and ball bearings 39A (not visible), arranged in substantially the same way as is illustrated in FIG. 7, to the ends of the corresponding connecting rods 42. The rods 42 extend substantially lengthwise in opposite directions inside the hollow frame portion 1 and the ends thereof that are remote from the mechanisms 28 and 29 carry forks 43 whose limbs are turnably connected, by further pivots 39 and ball bearings 39A, to locations that are midway along the lengths of arms 40 and 41, respectively, the arm 40 being secured to the upper sleeve 6 which is carried by that shaft 2 which is second to the left from the center of the frame portion 1 when the latter is viewed from the rear in the direction A whereas the arm 41 is secured to the central sleeve 5 on that shaft 2 which is second to the right from the center of the hollow frame portion 1 when the latter is viewed from the rear in the direction which has just been mentioned. The arms 40 and 41 that correspond to the second shafts 2 at opposite sides of the midpoint of the hollow frame portion 1 have their radially outer free ends turnably connected by further pivots 39 and ball bearings 39A to forks 44 which are mounted at the ends of corresponding connecting rods 45. The other ends of the rods 45 are, in turn, connected by still further pivots 39 and ball bearings 39A to arms 40 and 41, respectively, which correspond to the fourth and outermost shafts 2 from the opposite sides of the midpoint of the frame portion 1, the connections of these arms 40 and 41 to those shafts 2 being the same as have already been described. The radially outer, and leading with respect to the direction A, ends of the arms 40 and 41 that correspond to those two shafts 2 which are nearest to the midpoint of the hollow frame portion 1 are connected by still further pivots 39 and ball bearings 39A to forks 44 at the ends of two more of the connecting rods 45 and it will be seen from FIG. 2, in particular, of the drawings that the opposite ends of said connecting rods 45 are coupled by further pivots 39 and ball bearings 39A to arms 40 and 41 that correspond to the shafts 2 which are third to the left and to the right from the midpoint of the hollow frame portion 1 when the latter is viewed from the rear in the direction A.

Figure 3:
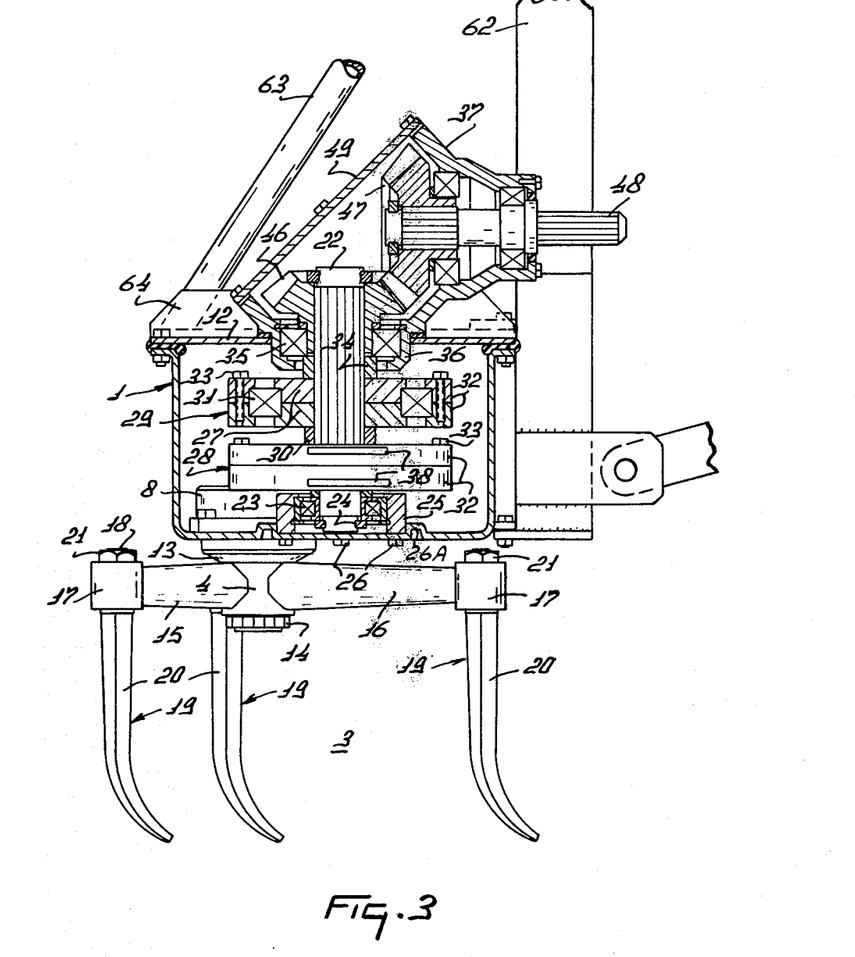
FIG. 3 is a section, to an enlarged scale, taken on the line III—III in FIG. 1.

The upper end of the rotary shaft 22 that is located inside the gear box 37 (FIG. 3) has a bevel pinion 46 releasably secured to it by a nut. The teeth of the bevel pinion 46 are in driven mesh with those of a second bevel pinion 47 that is secured by a nut to a substantially horizontal shaft 48 that extends parallel or substantially parallel to the direction A, said shaft 48 having a leading splined end which is intended, in the use of the implement, to be connected to the rear power take-off shaft of an agricultural tractor or other operating vehicle through the intermediary of a telescopic transmission shaft, that is of a construction which is known per se, having universal joints at its opposite ends. Such a shaft is illustrated somewhat diagrammatically in FIG. 1 of the drawings. The shaft 48 is rotatably journalled in the gear box 37 by horizontally spaced apart ball bearings whose positions and arrangements are diagrammatically illustrated in FIG. 3 of the drawings. Access to the interior of the gear box 37 is readily available since that gear box is provided with a removable cover plate 49 that is secured in its operative position by small bolts. As can be seen in FIGS. 1 and 3 of the drawings, the cover plate 49 is obliquely disposed, its leading extremity with respect to the direction A being uppermost and its rearmost extremity lowermost. The opposite ends of the hollow frame portion 1 are closed by substantially vertically disposed side plates 50 which side plates are in parallel relationship with one another and parallel or substantially parallel relationship with the direction A. The two side plates 50 are provided, near their centers with substantially horizontally aligned stub shafts 51, and corresponding arms 52 which extend generally rearwardly with respect to the direction A, from said stub shafts 51 alongside the respective plates 50, are turnable upwardly and downwardly about the stub shafts 51. A rear edge region of each plate 50 that extends behind the back wall of the hollow frame portion 1 is formed with a curved row of holes that are equidistant from the axis that is defined by the stub shafts 51. Holes are formed in the arms 52 at the same distance from the stub shafts 51 as are the holes in the side plates 50 and retaining bolts 53 are provided for substantially horizontal entry through the holes in the arms 52 and chosen ones of the curved rows of holes that are close to the rear edges of the corresponding side plates 50. The rearmost ends of the arms 52, with respect to the direction A, carry substantially horizontally aligned bearings and a roller 54 of open-work cage-formation is mounted between said bearings so as to be freely rotatable about a substantially horizontal axis that is substantially parallel to the transverse length of the hollow frame portion 1 and the plane a and thus usually (as illustrated) perpendicular or substantially perpendicular to the direction A. The roller 54 comprises a central, preferably tubular, axially extending support 55 to which a plurality, such as five, of substantially vertical and substantially circular support plates 56 are fastened so as to extend parallel to one another and parallel or substantially parallel to the direction A at regularly spaced apart intervals along the length of the central support 55, two of the support plates 56 being located close to the opposite axial ends of the roller 54. The support plates 56 are formed, close to their peripheries, with circular rows of holes that are spaced apart from one another by regular distances around the longitudinal axis of the roller 54 and elongate elements 57 of either solid rod-like formation or tubular formation are entered lengthwise through the holes in the successive plates 56 in such a way as to extend helically around the axis of rotation of the roller 54. The roller 54 extends throughout substantially the whole of the working width of the row of eight soil working members 3 and it will be apparent that the level of the axis of rotation thereof that is chosen, relative to the level of the frame portion 1 and soil working members 3, is a principal factor in determining the maximum depth of penetration of the tines 19 of the members 3 into the soil which is possible during the operation of the implement. Adjustments in this respect are made by temporarily removing the bolts 53 and turning the arms 52 upwardly or downwardly, as may be required, about the stub shafts 51, finally replacing the retaining bolts 53 so as reliably to maintain the newly adjusted setting.

Two further substantially horizontally aligned stub shafts 58 are secured to the side plates 50 of the frame portion 1 at locations which are close to the centers of those side plates but in advance of the stub shafts 51 with respect to the direction A. Each stub shaft 51 has a corresponding arm 59, that extends generally forwardly therefrom with respect to the direction A, mounted thereon so as to be turnable upwardly and downwardly alongside the neighbouring plate 50. The side plates 50 project forwardly beyond the front wall of the hollow frame portion 1 by short distances and the forwardly projecting portions are formed with curved rows of holes that are equidistant from the axis that is defined by the aligned stub shafts 58. The arms 59 are also formed with holes at the same distance from the stub shafts 58 as are the holes in the forwardly projecting portions of the side plates 50 and retaining bolts 60 are provided for substantially horizontal entry through the holes in the arms 59 and chosen ones of the holes in the corresponding curved rows which are formed in the forwardly projecting portions of the side plates 50. The leading ends of the arms 59, with respect to the direction A, are bent over downwardly and said ends are rigidly interconnected by a soil levelling beam 61 that extends substantially horizontally parallel to the transverse length of the frame portion 1 and thus to the plane a. It will be apparent that the soil levelling beam 61 can be raised, or lowered, in position relative to the frame portion 1 by temporarily removing the bolts 60 and turning the arms 59 upwardly or downwardly, as may be required, about the corresponding stub shafts 58, the bolts 60 being replaced and tightened to maintain the beam 61 at the newly chosen level relative to the frame portion 1 and soil working members 3. The level of the beam 61 will usually be set having regard to the maximum depth of penetration of the tines 19 that has already been selected by upward or downward bodily adjustment of the roller 54 with respect to those parts. The levelling beam 61 extends throughout substantially the same working width as the row of soil working members 3 and the roller 54. The front of the frame portion 1, with respect to the direction A, is provided with a coupling member or trestle 62 that is of substantially triangular configuration as seen in front or rear elevation (see FIG. 2), said coupling member or trestle 62 being located midway between the substantially parallel planes of the two side plates 50 of the frame portion 1. The lower ends of the upwardly convergent beams of the coupling member or trestle 62 co-operate with the leading ends, with respect to the direction A, of supports 64 of channel-shaped cross-section that are secured to the hollow frame portion 1, immediately above its top cover plate 12, so as to extend parallel to one another and parallel or substantially parallel to the direction A. Strengthening tie beams 63 diverge downwardly and rearwardly with respect to the direction A from substantially the apex of the coupling member or trestle 62 and have their rear and lower ends secured to the two supports 64 at locations which are close to the rearmost ends of those supports 64 and between the upwardly projecting limbs thereof (see FIGS. 1, 2 and 3).

In the use of the soil cultivating implement that has been described, its coupling member or trestle 62 is connected to the three-point lifting device or hitch at the rear of an agricultural tractor or other operating vehicle in the manner which is generally known per se and which is illustrated somewhat diagrammatically in FIGS. 1 and 3 of the drawings. The forwardly projecting and splined leading end of the shaft 48 is placed in driven connection with the rear power take-off shaft of the same agricultural tractor or other operating vehicle through the intermediary of the known telescopic transmission shaft that has universal joints at its opposite ends, that shaft being illustrated somewhat diagrammatically in FIG. 1 of the drawings. It may be necessary, before work commences, to set the maximum depth to which the tines 19 can penetrate into the soil by upward or downward bodily adjustment of the roller 54 relative to the frame portion 1 and soil working members 3 in the manner that has been described above, the effective level of the beam 61 then also being correspondingly adjusted. Although this has not been described and is not illustrated in the accompanying drawings, it is possible for the gear box 37 to incorporate, or be provided with, a simple change-speed gear so that the members 3 can be caused to oscillate about the axes of the shafts 2 at different speeds in response to a substantially constant input speed of rotation that will be applied to the shaft 48. If such a change-speed gear is provided, then it may require adjustments, before work commences, to increase or decrease the speed of oscillation of the members 3 having regard to the nature and condition of the soil that is to be cultivated. These considerations usually also govern the maximum depth of penetration of the tines 19 into the soil which is chosen and, naturally, the particular purpose for which the soil is required, after treatment, is also a factor that needs to be considered in regard to the making of these adjustments. As the implement proceeds operatively in the direction A over soil that is to be cultivated, the transmission parts that are contained within the hollow frame portion 1 are at least partially immersed in oil or other liquid lubricant, each shaft 2 and the corresponding soil working member 3 being oscillated about the axis of the shaft 2 concerned in the directions that are indicated by arrows in FIGS. 1 and 4 of the drawings and, of course, alternately in directions that are opposite to the ones which are indicated by those arrows. The eccentric mechanisms 28 and 29 that are located close to the midpoint of the hollow frame portion 1 translate the rotary motion of the shaft 22 into oscillation of the immediately neighbouring arms 40 and 41 and reciprocation of the connecting rods 42. The rods 42 oscillate further ones of the arms 40 and 41 and the connecting rods 45 which are pivotably connected to the various arms 40 and 41 are reciprocated by those arms and, in turn, cause rediprocation of still further arms 40 and 41, as described in detail above, and consequent oscillation of the corresponding shafts 2 and soil working members 3. This arrangement of the drive transmission within the hollow frame portion 1 is such that, at any instant during operation at which one soil working member 3 is turning in one direction about the axis of its shaft 2, the immediately neighbouring member 3, or both of the immediately neighbouring members 3, will be turning in the opposite direction about the longitudinal axis of the or each corresponding shaft 2. As previously mentioned, the strips of land that are worked by the individual members 3 overlap one another to form, in effect, a single broad strip of worked soil.

It will be apparent from a study of FIGS. 1 and 4 of the drawings that, at instants during the operation of the implement, four of the eight soil working members 3 will be disposed in positions in which their longer arms 16 project forwardly with respect to the corresponding shafts 2 in the direction a while the other four soil working members 3, that lie alternately between the four that have just been mentioned, are so disposed that their longer arms 16 project rearwardly from the corresponding shafts 2 in the direction A. This arrangement, combined with the provision of the two shorter arms 15 and one longer arm 16 in each soil working member 3, substantially completely suppresses any tendency to lateral jerking of the implement which might otherwise occur as a result of the asymmetric construction of each soil working member 3 with respect to the plane a. The quite rapid oscillatory movement of the members 3 and the forwardly curved formation of the lower ends of the soil working portions 20 of their tines 19 combines with the overlapping working widths of the individual members 3 in producing a well crumbled soil formation even when wet and/or heavy land is being dealt with. In addition to the supporting and depth control functions of the roller 54, that roller will crush and thus break up any lumps of soil that may have been left upon the surface of the ground by the immediately foregoing soil working members 3, the leading soil levelling beam 61 acting initially to smooth the surface of the ground that is to be dealt with by the members 3 so that the tines 19 of those members 3 will usually all penetrate into the soil down to substantially the same depth. The drive transmission to the oscillatory soil working members 3 is substantially completely sealed inside the hollow frame portion 1 against external contamination and can thus be constantly lubricated by at least partial immersion in oil or other liquid lubricant contained inside the frame portion 1. The oil or other liquid lubricant remains substantially free of contamination and thus does not require frequent replacement.

Although certain features of the soil cultivating implement that has been described and/or that is illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What I claim is:

1. A soil cultivating implement comprising a frame and a plurality of soil cultivating members rotatably mounted in a transverse row on an elongated hollow portion of said frame, said frame portion extending transverse to the direction of travel and said members being rotatable about corresponding upwardly extending axes, driving means connected to oscillate said members about their axes and said driving means including eccentric drive means interconnected to said members, said drive means being housed within said frame portion and an input connected to transmit power to said driving means, said driving means comprising at least two eccentric mechanisms arranged one above the other on a common upwardly extending drive shaft that is located substantially centrally relative to said row of soil cultivating members when viewed from the rear, one eccentric mechanism being directly connected to a soil cultivating member and that member being adjacent one side of the midpoint of said frame portion, when viewed from the rear, said one mechanism also being directly connected to a further soil cultivating member that is second from the opposite side of said midpoint.

2. An implement as claimed in claim 1, wherein said hollow frame portion is substantially completely enclosed and contains liquid lubricant, said driving means being at least partially immersed in the lubricant.

3. An implement as claimed in claim 1, wherein the axes of oscillation of said soil cultivating members are contained in a plane that extends transverse to the direction of travel and said plane is substantially parallel to the longitudinal axis of said frame portion, said plane being spaced behind the longitudinal axis of the frame portion.

4. An implement as claimed in claim 3, wherein each eccentric mechanism comprises at least one disc eccentrically mounted on said shaft, the disc of one mechanism being angularly offset by substantially 180° about the axis of said shaft with respect to the disc of the other mechanism, as regards their eccentricities.

5. An implement as claimed in claim 4, wherein each eccentric mechanism comprises a pair of substantially symmetrically opposed discs and a pair of substantially symmetrically opposed surrounding rings.

6. An implement as claimed in claim 3, wherein the soil cultivating member that is adjacent said midpoint is drivingly connected to the soil cultivating member that is third from said midpoint at the same side thereof.

7. An implement as claimed in claim 6, wherein the soil cultivating members positioned second from either side of said midpoint is drivingly connected to the fourth soil cultivating member from said midpoint at the same side thereof.

8. An implement as claimed in claim 7, wherein drive connections between said mechanisms and the soil cultivating members which are second from each side of said midpoint each comprising a connecting rod, and further connections between the soil cultivating members that are positioned at each opposite side of said midpoint, said rods and further rods being located in front of the axes of oscillation of said soil cultivating members, and coupled to arms linked to cultivating member shafts which define said axes of oscillation.

9. An implement as claimed in claim 8, wherein in the central positions of said soil cultivating members relative to their axes of oscillation, a first set of arms are located at substantially the same horizontal level within said frame portion and are substantially parallel to one another.

10. An implement as claimed in claim 1, wherein each soil cultivating member comprises a plurality of tines and there are more tines at one side of the respective axis of oscillation of that member than there are at the opposite side of said respective axis.

11. An implement as claimed in claim 10, wherein each soil cultivating member comprises at least two tines that are spaced different distances away from the respective axis of oscillation of that member.

12. An implement as claimed in claim 11, wherein there are three tines of said member carried by corresponding spaced apart arms and said arms are located about the respective axis of oscillation by angles of substantially 120°.

13. A soil cultivating implement comprising a frame and a plurality of tined soil cultivating members rotatably mounted in a transverse row on an elongated hollow portion of said frame, said frame portion extending transverse to the direction of travel and said members being rotatable about axes defined by corresponding upwardly extending shafts, driving means connected to oscillate said members about their axes and said driving means including eccentric drive means interconnected to said members, said drive means being housed within said frame portion and an input connected to transmit power to said driving means, the axes of oscillation of said soil cultivating members being contained in a plane that extends transverse to the direction of travel, said driving means comprising at least two eccentric mechanisms arranged one above the other on a common upwardly extending drive shaft that is located substantially centrally relative to said row of soil cultivating members and in advance of said plane containing the axes of oscillation of said soil cultivating members when viewed from the rear, each eccentric mechanism being directly connected to a respective soil cultivating member and that member being adjacent one side of the midpoint of said frame portion when viewed from the rear, said one mechanism also being directly connected to a corresponding further soil cultivating member that is second from the opposite side of said midpoint.

14. An implement as claimed in claim 13, wherein each soil cultivating member comprises three tines carried on spaced apart arms, two of said arms being shorter than a longer arm, the longer arms of alternate soil cultivating members extending forwardly and in opposite directions from the longer arms of neighboring soil cultivating members, said driving means connected to oscillate said alternate members in one direction and said neighboring members in an opposite direction.

15. An implement as claimed in claim 14, wherein there are eight soil cultivating members arranged in a row which extends transverse to the direction of travel and four of said members are located at one side of an eccentric mechanism, the other four members being positioned at the opposite side of said mechanism, said members having tines positioned to work strips that overlap one another.

16. An implement as claimed in claim 15, where an elongated roller is connected to the frame and said roller extends transverse to the direction of travel, said roller being interconnected to the frame at the rear of said members and adjusting means setting the roller at a chosen level relative to the soil cultivating members, said roller comprising a plurality of circumferentially arranged ground-contacting elongate elements that extend helically around the axis of rotation of the roller.

17. An implement as claimed in claim 16, wherein a soil levelling beam is positioned in advance of the soil cultivating members setting means interconnecting said beam to said frame portion at any chosen one of a plurality of different levels relative to the level of said members.

18. An implement as claimed in claim 13, wherein said rods are located in front of said shafts and the latter are positioned to the rear of a center line of the frame portion.

* * * * *